United States Patent
Kim

(10) Patent No.: US 6,845,418 B2
(45) Date of Patent: Jan. 18, 2005

(54) BUS SYSTEM FOR MASTER-SLAVE DEVICE ACCESSES, HAS MULTIPLE PSEUDO-DELAYER CONNECTED TO CONTROLLERS WHICH DELAY AND OUTPUT ACCESS COMMANDS TO SLAVE DEVICES FOR HAVING LONGER LATENCY PERIODS

(75) Inventor: Jin-soo Kim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 405 days.

(21) Appl. No.: 09/801,048

(22) Filed: Mar. 8, 2001

(65) Prior Publication Data

US 2002/0019895 A1 Feb. 14, 2002

(30) Foreign Application Priority Data

Aug. 5, 2000 (KR) ........................................ 2000-45452

(51) Int. Cl.⁷ ........................ G06F 13/18; G06F 13/362
(52) U.S. Cl. ........................ 710/244; 710/107; 710/36; 710/58; 710/118; 710/125; 710/240
(58) Field of Search .................... 710/240–244, 710/112–125, 36–45, 58–61, 104–110, 305, 306, 309, 308, 311, 313–315, 200, 220, 267; 713/500–502, 400, 401, 600, 601

(56) References Cited

U.S. PATENT DOCUMENTS

| | | | | |
|---|---|---|---|---|
| 4,253,147 A | * | 2/1981 | MacDougall et al. | ....... 711/100 |
| 5,564,027 A | | 10/1996 | Bui et al. | |
| 5,630,096 A | * | 5/1997 | Zuravleff et al. | ........... 711/100 |
| 5,649,209 A | * | 7/1997 | Umetsu et al. | ............. 710/109 |
| 5,682,353 A | * | 10/1997 | Eitan et al. | .................. 365/233 |
| 5,729,766 A | * | 3/1998 | Cohen | ......................... 713/401 |
| 5,754,800 A | | 5/1998 | Lentz et al. | |
| 5,768,529 A | | 6/1998 | Nikel et al. | |
| 5,784,582 A | * | 7/1998 | Hughes | ...................... 710/117 |
| 5,915,104 A | | 6/1999 | Miller | |
| 5,925,118 A | * | 7/1999 | Revilla et al. | .............. 710/110 |
| 5,974,514 A | * | 10/1999 | Andrewartha et al. | ...... 711/166 |
| 6,081,860 A | | 6/2000 | Bridges et al. | |
| 6,178,477 B1 | * | 1/2001 | Jaramillo et al. | ........... 710/306 |
| 6,219,747 B1 | * | 4/2001 | Banks et al. | ................ 711/105 |
| 6,289,406 B1 | * | 9/2001 | Chambers et al. | .......... 710/107 |
| 6,392,955 B2 | * | 5/2002 | Pawlowski | ............. 365/230.06 |
| 6,484,246 B2 | * | 11/2002 | Tsuchida et al. | ............ 711/169 |
| 6,513,089 B1 | * | 1/2003 | Hofmann et al. | ........... 710/309 |
| 6,546,476 B1 | * | 4/2003 | Gillingham | ................. 711/167 |
| 6,671,761 B2 | * | 12/2003 | Kim | .......................... 710/244 |
| 6,772,254 B2 | * | 8/2004 | Hofmann et al. | ........... 710/110 |

FOREIGN PATENT DOCUMENTS

| | | |
|---|---|---|
| EP | 0 690 382 A2 | 1/1996 |
| GB | 1 290 587 | 9/1972 |
| JP | 1-152554 | 6/1989 |
| JP | 1-265349 | 10/1989 |
| JP | 11-194994 | 7/1999 |

* cited by examiner

*Primary Examiner*—Tim Vo
*Assistant Examiner*—Raymond N Phan
(74) *Attorney, Agent, or Firm*—Sughrue Mion, PLLC

(57) ABSTRACT

A bus system and a command delivering method includes (a) delivering a first command to a first slave device, and (b) delivering a second command to a second slave device at a point in time which is less than or equal to a latency time of the second slave device in advance of the completion of data transfer according to the first command. Accordingly, preparation necessary for data transfer can begin sooner, thereby reducing idle clock cycles of a data bus.

14 Claims, 4 Drawing Sheets

BUS SYSTEM FOR MASTER-SLAVE DEVICE ACCESSES, HAS MULTIPLE PSEUDO-DELAYER CONNECTED TO CONTROLLERS WHICH DELAY AND OUTPUT ACCESS COMMANDS TO SLAVE DEVICES FOR HAVING LONGER LATENCY PERIODS

BACKGROUND OF THE INVENTION

1. Field of the Invention

The present invention relates to a bus system and a command delivering method thereof, and more particularly, to a bus system including a plurality of slave devices, at least one slave device having a latency time for data input/output, and a command delivering method thereof.

2. Description of the Related Art

A bus system, including a plurality of master devices and a plurality of slave devices, generally adopts an arbiter for the purpose of sharing a common bus. The arbiter grants the control of a bus to a master device according to a predetermined arbitration algorithm, and the master device exclusively takes control of the bus until transfer of corresponding data is complete. Here, the bus includes an address/control bus and a data bus.

If a slave device is a memory, the slave device includes a memory device for storing data and a memory controller for controlling the memory device. If a command is output from a master device to the memory controller, the memory controller outputs a corresponding control signal to the memory device after having completed preparation for access to the memory device.

FIG. 6 is a timing block diagram for explaining a conventional process of delivering a command to a memory which is a slave device. A master execution cycle, a memory controller execution cycle, and a memory device execution cycle are shown in FIG. 6. The master execution cycle refers to the time beginning with the instant a master device outputs a command to a memory controller until the instant the master device is informed of execution completion of the output command and data transfer completion by the memory controller. The memory controller execution cycle means the time between the instant a control signal is output to a memory device after the latency time of the memory controller has lapsed upon receipt of the command output from the master device, and the instant data transfer is completed. The memory device execution cycle refers to the time beginning with a point when data transfer starts after the latency time of the memory device has lapsed until a point when the data transfer is completed. The latency time is the time required for executing a predetermined preparation process in the memory device or in the memory controller.

Referring to FIG. 6, a process of delivering a command for a memory such as a synchronous DRAM (SDRAM) recently adopted in a bus system will now be described in detail. If a command containing information necessary for data transfer, such as an address, a read/write flag, and a burst length, is input from a master device to an SDRAM controller which is a memory controller, the SDRAM controller extracts information necessary for data transfer from the command and outputs a corresponding control signal to the SDRAM. The SDRAM to which the control signal is input from the SDRAM controller accesses a memory cell of a predetermined memory bank after having completed a predetermined preparation process such as address decoding. As the SDRAM controller accesses the memory cell, data is output or input through a data bus. That is, to access the SDRAM, the preparation by the SDRAM controller is necessarily required. While preparation by the SDRAM controller is made, actual transfer of data is delayed, which is called a latency time. Referring to FIG. 6, the latency time is classified into two parts; a slave controller latency beginning with the instant a command is output from a master device until the instant a control signal is output from a slave controller, and a memory device latency beginning with the instant the control signal is output from the slave controller until the instant data is output from a memory device.

Meanwhile, when data transfer is complete, the SDRAM controller informs the master device of completion of execution of the command. The master device outputs a new command after having been informed of the execution completion by the SDRAM controller. Data transfer intended by the new command is made after a latency time for the preparation process described above has passed.

As a consequence, in the case of a slave device such as SDRAM, as shown in FIG. 6, there is an idle clock cycle on a data bus beginning with a point when a command is output from a master device before transfer of corresponding data, which thereby degrades the efficiency of data bus access as well as system performance.

SUMMARY OF THE INVENTION

To solve the above problems, it is an objective of the present invention to provide a bus system capable of improving performance of the entire system by reducing idle clock cycles of a data bus, and a command delivering method thereof.

Accordingly, to achieve the above objectives, the present invention provides a command delivering method for a bus system including a master device and two or more slave devices. The command delivering method according to the present invention includes the steps of (a) delivering a first command to a first slave device, and (b) delivering a second command to a second slave device at a point in time which is less than or equal to a latency time of the second slave device in advance of the completion of data transfer according to the first command.

Prior to the step (b), the method preferably further includes the steps of (b1) the first slave device informing a corresponding master device of pseudo execution completion indicating that data transfer is complete at a point in time which is less than or equal to the latency time in advance of the completion of data transfer, and (b2) receiving the second command for the second slave device upon receipt of the pseudo execution completion information.

The slave device includes a memory device and a slave controller for controlling the memory device. The step (a) includes the step of delivering the first command to a first slave controller, and the step (b) includes the step of (b') delivering the second command to a second slave controller at a point in time which is less than or equal to the latency time in advance of the completion of data transfer according to the first command.

Prior to the step (b'), the method preferably further includes the steps of (b'1) the first slave controller informing a corresponding master device of pseudo execution completion indicating that data transfer is complete at a point in time which is less than or equal to the latency time in advance of the completion of data transfer, and (b'2) receiving the second command for the second slave device from the corresponding master device that has received the pseudo execution completion information.

The memory device is a synchronous dynamic random access memory (SDRAM), and the slave controller is an SDRAM controller.

The present invention also provides a method of delivering a command in a bus system including a master device and two or more slave devices, at least one of the slave devices having a latency time for data input/output. The command delivering method includes the steps of (a) providing a difference value between the longest of the latency times and the latency time of each slave device, (b) receiving a first command for a first slave device from the master device, and (c) delivering the first command to the first slave device after a time equivalent to the difference value corresponding to the first slave device has lapsed.

Preferably, the method further includes the step of (d) delivering a second command to a second slave device at a point in time which is less than or equal to a latency time of the second slave device in advance of the completion of data transfer according to the first command.

The present invention also provides a bus system including a master device and two or more slave devices, at least one of which has a latency time for data input/output. The bus system includes a pseudo-delayer for delivering a second command to a second slave device at a point in time which is less than or equal to a latency time of the second slave device in advance of a point in time when the fist slave device completes data transfer according to the first command.

Preferably, the first slave device informs the corresponding master device of pseudo execution completion information at a point in time which is less than or equal to a latency time of the second slave device in advance of the completion of data transfer according to the first command, and the corresponding master device receiving the pseudo execution completion information delivers the second command to the pseudo-delayer.

Preferably, the slave device includes a memory device having the latency time for data input/output, and a slave controller for controlling the memory device, and the pseudo-delayer delivers the first command to a first slave controller, and delivers the second command to a second slave controller at a point in time which is less than or equal to the latency time in advance of the completion of data transfer according to the first command.

Preferably, the first slave controller informs the corresponding master device of a pseudo execution completion at a point in time which is less than or equal to the latency time in advance of the completion of data transfer according to the first command, and the corresponding master device delivers the second command to the pseudo-delayer upon receipt of the pseudo execution completion.

Furthermore, the memory device is a synchronous dynamic random access memory (SDRAM), and the slave controller is an SDRAM controller.

The present invention also provides a bus system including a master device and two or more slave devices, at least one of which has a latency time for data input/output. The bus system according to the present invention includes a pseudo-delayer which includes a storing unit for storing a number of delay clock cycles which corresponds to the difference between the longest of the latency times and the latency time of each slave device, receives a first command for a first slave device from the master device, and delivers the first command to the first slave device after a number of delay clock cycles corresponding to the number stored in the storing unit have lapsed.

Preferably, the slave device includes a memory device having the latency time and a slave controller for controlling the memory device. A first slave controller informs the corresponding master device of pseudo execution completion at a point in time which is the latency time in advance of the completion of data transfer according to the first command, and the corresponding master device delivers the second command to the pseudo-delayer upon receipt of the pseudo execution completion information.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Figure 1:
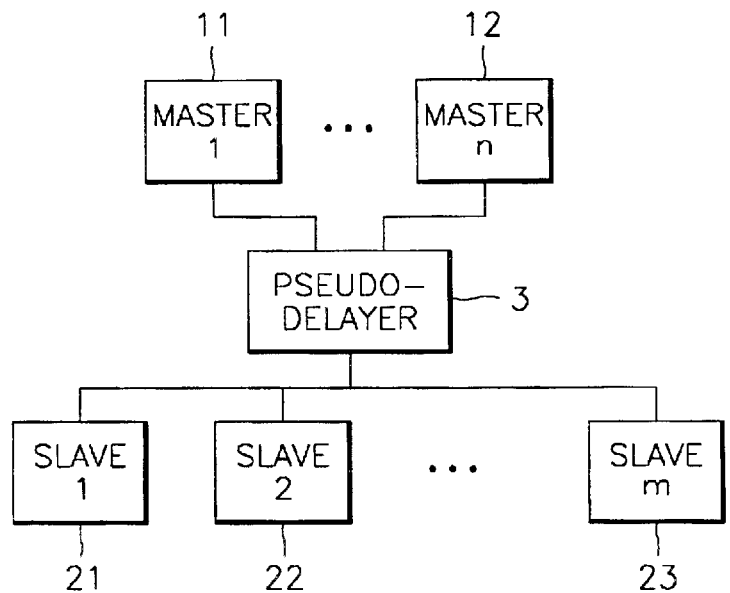
FIG. 1 is a schematic diagram showing a bus system according to a preferred embodiment of the present invention.

Referring to FIG. 1, the bus system includes one or more master devices 11 and 12, a plurality of slave devices 21, 22, and 23, and a pseudo-delayer 3. The master devices 11 and 12, and the plurality of slave devices 21, 22, and 23 are interconnected by a data bus which is not shown in detail for simplification. The data bus may include a main data bus and a local data bus which function at different transfer speeds. Furthermore, an arbiter (not shown) is connected between the master devices 11 and 12 and the slave devices 21, 22, and 23 for arbitrating the bus access according to a predetermined arbitration algorithm.

The master devices 11 and 12 generally refer to a processor or a direct memory access (DMA) controller, and the slave devices 21, 22 and 23 refer to a memory such as a RAM or a ROM, an I/O device, an operator, or other peripheral devices. In particular, at least one of the slave devices 21, 22, and 23 has a latency time. For convenience of description, it is assumed that the slave devices 21 and 22 are a memory and an operator, both having a latency time, respectively. In this case, the number of master devices or slave devices varies depending on applications.

The pseudo-delayer 3 provided according to a preferred embodiment of the present invention receives a command from a predetermined master device 11 or 12, and delivers the command to a corresponding slave device 21, 22 or 23 after a predetermined number of delay clock cycles have lapsed. That slave device 21, 22 or 23 sends a pseudo execution completion signal indicating that data transfer is complete to the master device 11 or 12 issuing the command at a point which is a number of clock cycles corresponding to a latency time in advance of real completion of data transfer according to the command. The real time of completion of data transfer is determined by a burst length contained in the command. The burst length means the length of burst transmission data.

Figure 2:
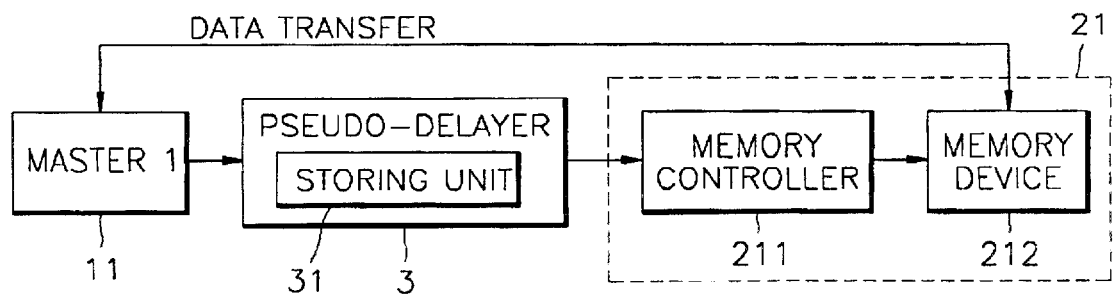
FIG. 2 is a block diagram for explaining the process of delivering a command between master devices and a memory which is a slave device.

FIG. 2 is a block diagram for explaining the order of delivering a command between the master device 11 and a memory which is the slave device 21. Referring to FIG. 2, the slave device 21 is a memory device 212 in which data is stored, and a memory controller 211 for controlling the memory device 212. The pseudo-delayer 3 includes a storing unit 31 in which the number of delay clock cycles corresponding to the slave devices 21, 22, and 23 is stored. A method of determining the number of delay clock cycles will later be described. The storing unit 31 may be implemented as a register.

The pseudo-delayer 3 receives a command for the slave device 21 from the master device 11, and delivers the command to the memory controller 211 after a number of delay clock cycles corresponding to the number of delay clock cycles stored in the storing unit 31 for slave device 21 have lapsed.

Figure 3:
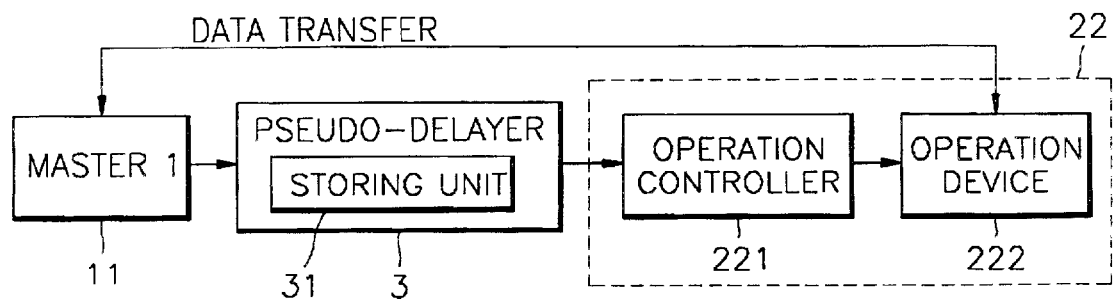
FIG. 3 is a block diagram for explaining the process of delivering a command between master devices and an operator which is a slave device.

FIG. 3 is a block diagram for explaining the order of delivering a command between the master device 11 and an operator which is the slave device 22. Referring to FIG. 3, the slave device 22 includes an operation device 222 for performing an operation, and an operation controller 221, which is a slave controller, for controlling the operation device 222. The pseudo-delayer 3 receives a command for the slave device 22 from the master device 11, and delivers the command to the operation controller 221 after a delay of a number of clock cycles corresponding to the number of delay clock cycles stored in the storing unit 31 for slave device 22 has lapsed.

The number of delay clock cycles is determined from a latency time of the slave device 21, 22, or 23. For example, if the total number of slave devices in a bus system is 3, and a corresponding latency time is 5, 6, and 4 clock cycles, the number of delay clock cycles is 1, 0, 2 clock cycle(s), respectively. That is, the number of delay clock cycles is equal to the difference with the longest latency time. In this way, the pseudo-delayer 3 serves to make the latency time of all slave devices 21, 22, and 23 equal at six clock cycles.

Meanwhile, if a burst length is "4", which means that data of a length "4" are consecutively transmitted, the slave devices 21, 22, or 23 informs the master device 11 or 12 associated with it of a pseudo execution completion exactly six clock cycles in advance of completion of the four data transfer.

Figure 4:
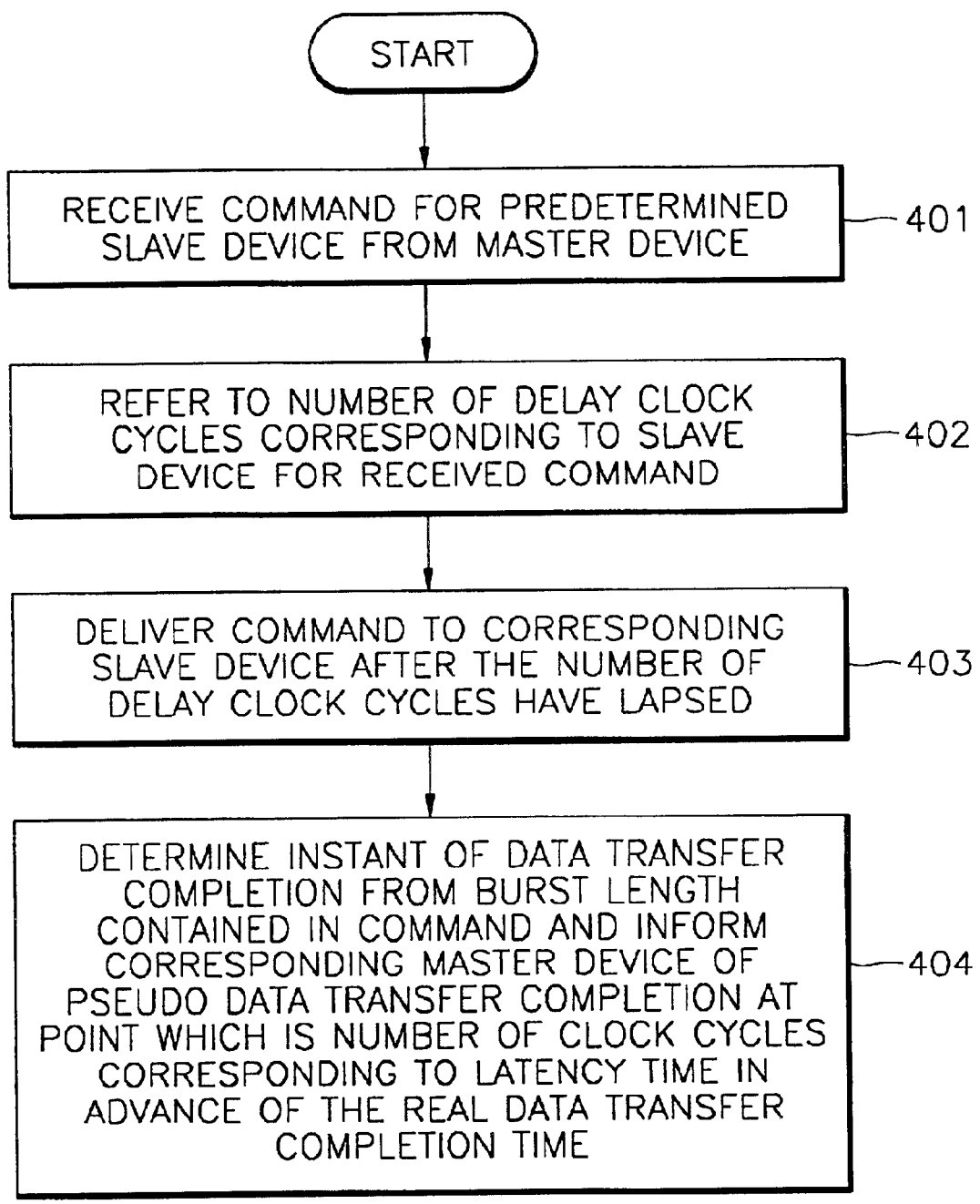
FIG. 4 is a flowchart for explaining a command delivering method according to a preferred embodiment of the present invention.

Based on the above configuration, a method of delivering a command according to a preferred embodiment of the invention will now be described. FIG. 4 is a flowchart for explaining a command delivering method. Referring to FIG. 4, the pseudo-delayer 3 receives a command for a predetermined slave device 21, 22, or 23 from the master device 11 or 12 (step 401). Next, the number of delay clock cycles corresponding to the slave device 21, 22, or 23 for the received command is retrieved from the storing unit 31 (step 402). After the appropriate number of delay clock cycles has lapsed, the pseudo-delayer 3 delivers the command to the corresponding slave device 21, 22, or 23 (step 403).

Finally, the slave device 21, 22, or 23 that has received the command determines the instant data transfer is complete from a burst length contained in the command, and informs the corresponding master device 11 or 12 of pseudo execution completion of data transfer, at the instant which is a number of clock cycles corresponding to a latency time in advance of the real completion of data transfer (step 404). Upon receipt of the pseudo execution completion, the master device 11 or 12 can start the next access to the data bus. The latency time in the step 404 refers to the longest of the latency times of the slave devices 21, 22 and 23.

Figure 5:
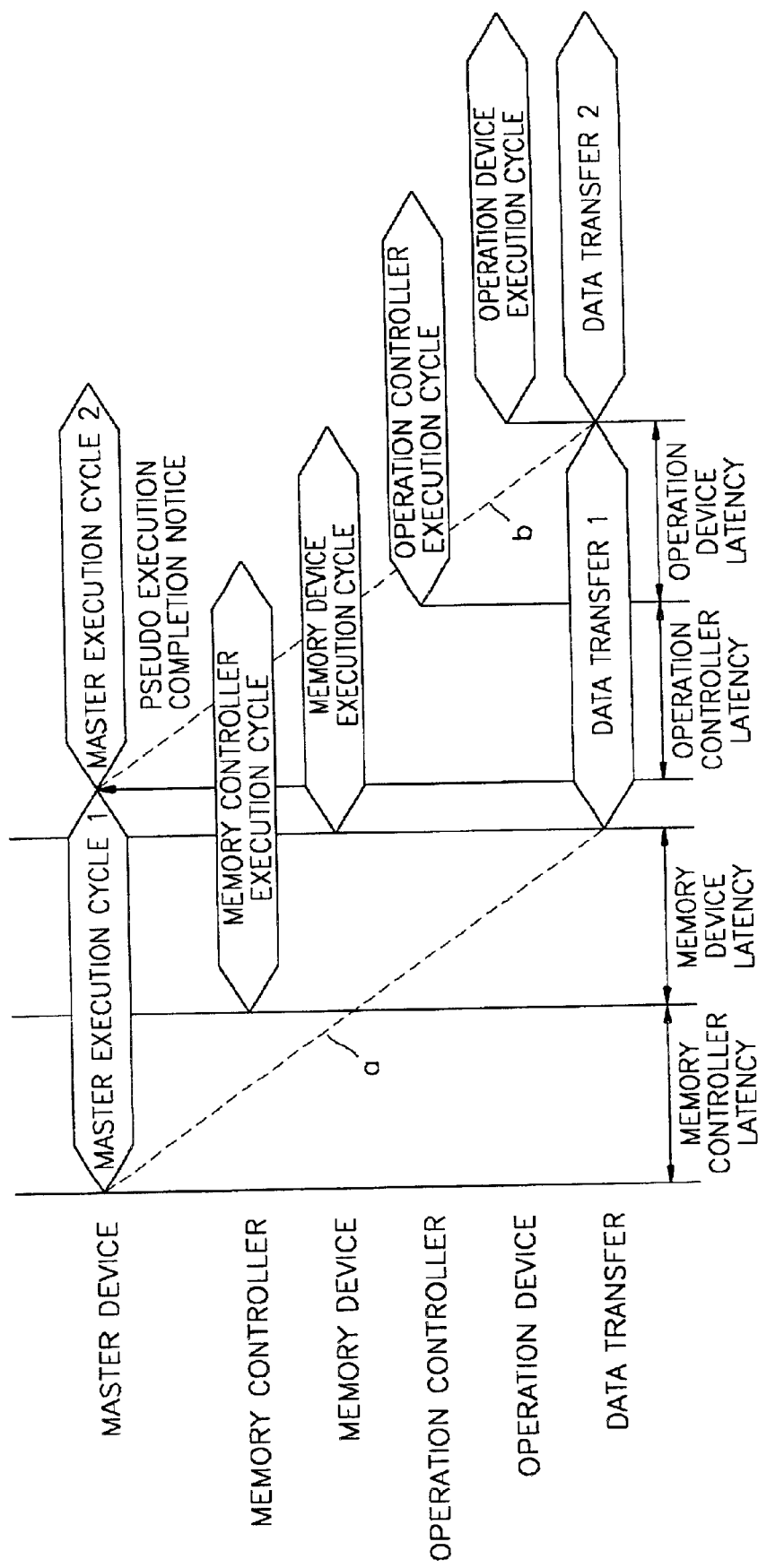
FIG. 5 is a timing block diagram showing the command delivering method of FIG. 4.
Figure 6:
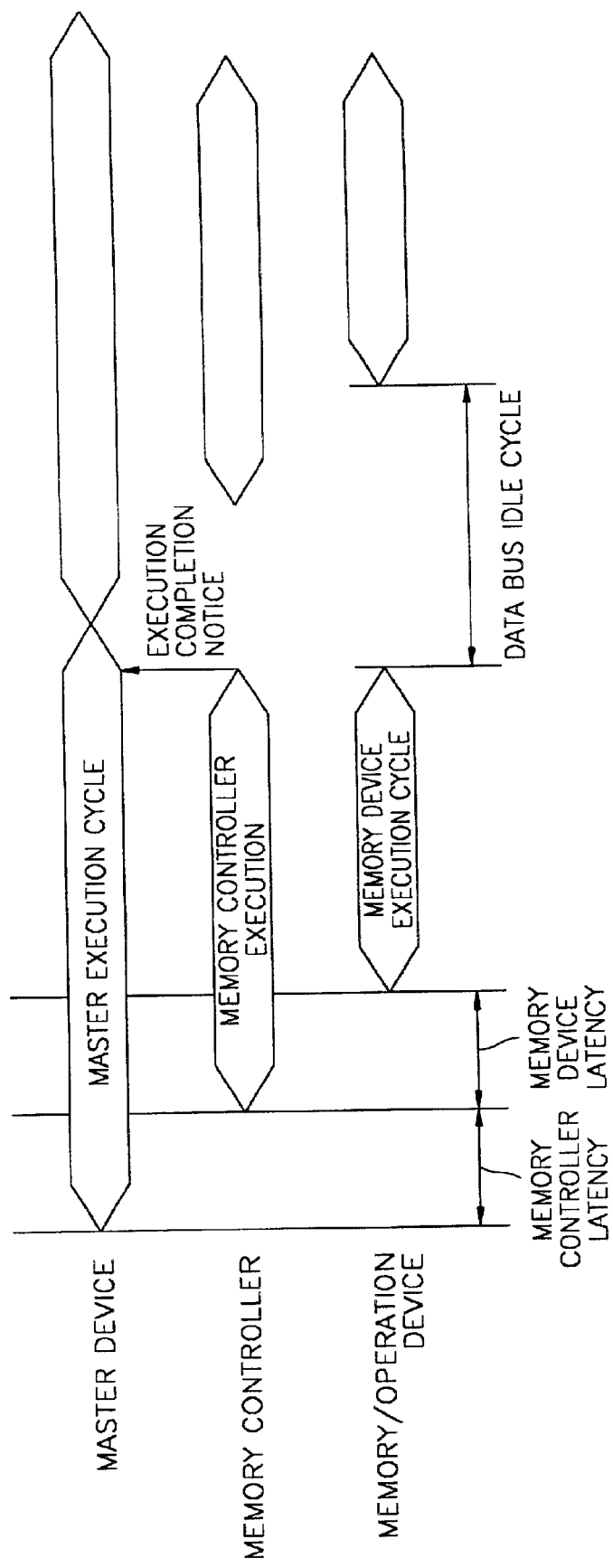
FIG. 6 is a block diagram for explaining a process of delivering a command to a conventional slave device.

FIG. 5 is a timing block diagram showing the command delivering method of FIG. 4. Referring to FIG. 5, a first command is sent to the slave device 21, and a second command to the slave device 22. The pseudo-delayer 3 informs the slave device 21 of pseudo execution completion at a point in time which is a latency time corresponding to an operation controller latency plus an operation device latency in advance of the real completion of data transfer of the slave device 21. Also, the pseudo-delayer 3 sends the command to the memory controller 211 or the operation controller 221, delayed by the number of delay clock cycles required such that the latency times of the slave devices 21 and 22 are the same. Thus, the gradient "a" of a straight line connecting a "master execution cycle 1" and a "data transfer 1" is the same as the gradient "b" of a straight line connecting a "master execution cycle 2" and a "data transfer 2".

According to the present invention, data transfer (data transfer 1) of the slave device 21 and data transfer (data transfer 2) of the slave device 22 are continuously made without idle clock cycles.

Meanwhile, whether there are only two slave devices are shown in FIG. 2, or three or more slave devices, a pseudo-delayer delays and sends commands so that all slave devices seem to have the same latency time, and then each slave device informs a corresponding master device of pseudo execution completion at a point in time which is a latency time in advance of the completion of data transfer. In this case, the apparent latency time of slave devices is unified as the longest of the original latency times of all the slave devices. Unifying the latency time makes equal the gradients of straight lines connecting the output of a command by master devices and data transfer on a data bus, which thereby enables continuous data transfer and improves the overall system efficiency.

Unlike the embodiment described above, the pseudo-delayer 3 may be provided for each slave device 21, 22, or 23. Even in this case, however, the pseudo-delayer 3 performs the same functions as in the above embodiment, that is, it receives commands from the master devices 11 and 12 and sends the commands delayed by the number of delay clock cycles and reports pseudo data transfer completion to a corresponding master device 11 or 12 at a point which is a predetermined number of delay clock cycles in advance of the real completion of data transfer. That is, the pseudo-delayer simply stores the number of delay clock cycles corresponding to each of the slave devices 21, 22, and 23, refers to them, and delivers the referred number of delay clock cycles later.

As described above, the present invention makes it possible for slave devices to begin preparation necessary for data transfer earlier, which thereby reduces idle clock cycles of a data bus. In particular, a memory supporting no pipeline transfer can provide for data transfer similar to pipelining. This is because a command for another slave device can be executed when actual transfer of data has not been completed by reporting pseudo execution completion.

Furthermore, the present invention makes the latency time of slave devices equal, and thereby can reduce idle clock cycles of a data bus caused by different latency times and prevent a conflict between data on the data bus. In particular, if the slave device is a memory such as SDRAM supporting pipeline transfer and performing frequent burst transmission, the number of idle clock cycles is significantly reduced, thereby improving the efficiency of a bus system.

It is contemplated that numerous modifications may be made to the present invention without departing from the spirit and scope of the invention as defined in the following claims.

What is claimed is:

1. A method of delivering a command in a bus system including one or more master devices and two or more slave devices, the method comprising the steps of:
   (a) delivering a first command to a first slave device; and
   (b) delivering a second command to a second slave device at a point in time which is less than or equal to a latency time of the second slave device in advance of the completion of data transfer according to the first command.

2. The method of claim 1, prior to the step (b), further comprising the steps of:
   (b1) the first slave device informing a corresponding master device of pseudo execution completion indicating that data transfer is complete at a point in time which is less than or equal to the latency time of the second slave device in advance of the completion of data transfer according to the first command; and
   (b2) receiving the second command for the second slave device upon receipt of the pseudo execution completion information.

3. The method of claim 1, wherein the first and second slave devices each include a memory device and a slave controller for controlling the memory device,
   wherein the step (a) comprises the step of delivering the first command to a first slave controller, and
   wherein the step (b) comprises the step of (b') delivering the second command to a second slave controller at a point in time which is less than or equal to the latency time of the second slave device in advance of the completion of data transfer according to the first command.

4. The method of claim 3, prior to the step (b'), further comprising the steps of:
   (b'1) the first slave controller informing a corresponding master device of pseudo execution completion indicating that data transfer is complete at a point in time which is less than or equal to the latency time of the second slave device in advance of the completion of data transfer according to the first command; and
   (b'2) receiving the second command for the second slave device from the corresponding master device that has received the pseudo execution completion information.

5. The method of claim 3, wherein each memory device is a synchronous dynamic random access memory (SDRAM), and the slave controller is an SDRAM controller.

6. A method of delivering a command in a bus system including a master device and two or more slave devices, at least one of the slave devices having a latency time for data input/output, the method comprising the steps of:
   (a) providing respective difference values between a longest of the latency times of all the slave devices and the latency time of each slave device;
   (b) receiving a first command for a first slave device from the master device; and
   (c) delivering the first command to the first slave device after a time equivalent to the difference value corresponding to the first slave device has lapsed.

7. The method of claim 6, further comprising the step of (d) delivering a second command to a second slave device at a point in time which is less than or equal to a latency time of the second slave device in advance of the completion of data transfer according to the first command.

8. A bus system including a master device and two or more slave devices, at least one of which has a latency time for data input/output, the bus system comprising a pseudo-delayer for delivering a second command to a second slave device at a first point in time which is less than or equal to a latency time of the second slave device in advance of a second point in time when a first slave device completes data transfer according to a first command.

9. The bus system of claim 8, wherein the first slave device informs a corresponding master device of pseudo execution completion information at a third point in time which is less than or equal to a latency time of the second slave device in advance of the completion of data transfer according to the first command, and the corresponding master device receiving the pseudo execution completion information delivers the second command to the pseudo-delayer.

10. The bus system of claim 8, wherein the first and second slave devices each comprise a memory device, and a slave controller for controlling the memory device, and
    wherein the pseudo-delayer delivers the first command to a first slave controller, and delivers the second command to a second slave controller at a fourth point in time which is less than or equal to the latency time of the second slave device in advance of the completion of data transfer according to the first command.

11. The bus system of claim 10, wherein the first slave controller informs a corresponding master device of a pseudo execution completion at a fifth point in time which is less than or equal to the latency time of the second slave device in advance of the completion of data transfer according to the first command, and
    wherein the corresponding master device delivers the second command to the pseudo-delayer upon receipt of the pseudo execution completion.

12. The bus system of claim 10, wherein each memory device is a synchronous dynamic random access memory (SDRAM), and the slave controller is an SDRAM controller.

13. A bus system including a master device and two or more slave devices, at least one of which has a latency time for data input/output, the bus system comprising a pseudo-delayer which includes a storing unit for storing a number of delay clock cycles which corresponds to respective differences between a longest of the latency times of all the slave devices and the latency time of each slave device, which receives a first command for a first slave device from the master device, and which delivers the first command to the first slave device after a number of delay clock cycles corresponding to the number stored in the storing unit for the first slave device have lapsed.

14. The bus system of claim 13, wherein the first slave device includes a memory device and a slave controller for controlling the memory device,
    wherein the slave controller informs a corresponding master device of pseudo execution completion at a point in time which is the longest of the latency times in advance of the completion of data transfer according to the first command, and
    wherein the corresponding master device delivers the second command to the pseudo-delayer upon receipt of the pseudo execution completion information.

* * * * *